July 3, 1945.                    A. G. CONRAD                    2,379,417
              ELECTRICAL REMOTE-READING POSITION-INDICATING APPARATUS
                         Filed Feb. 1, 1944           3 Sheets-Sheet 1
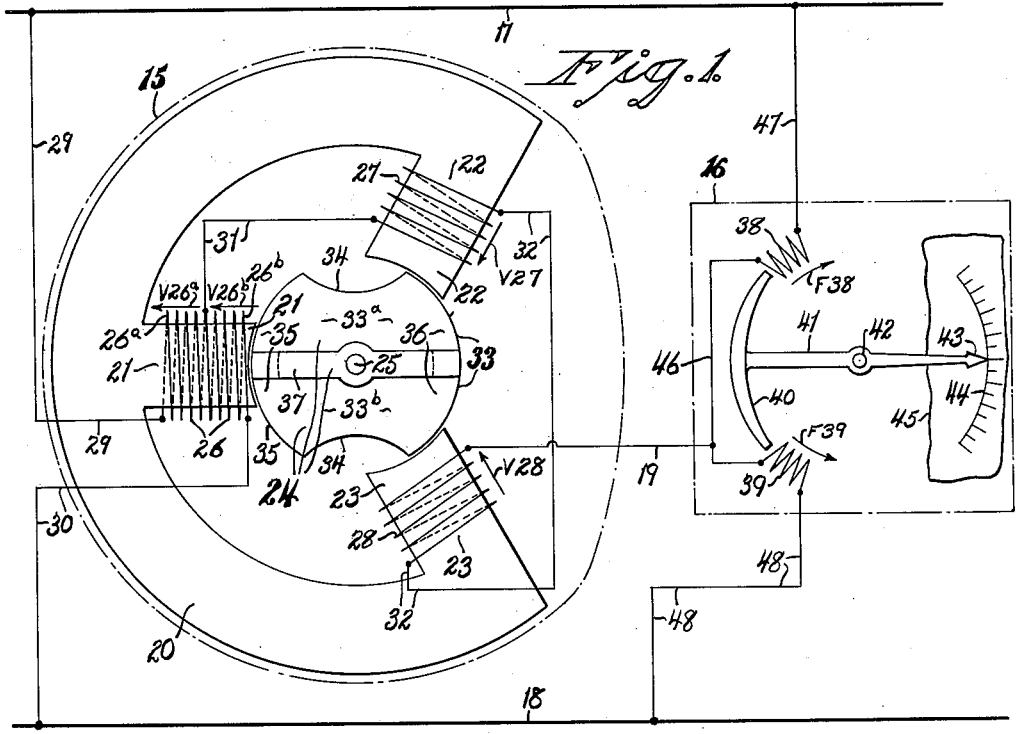
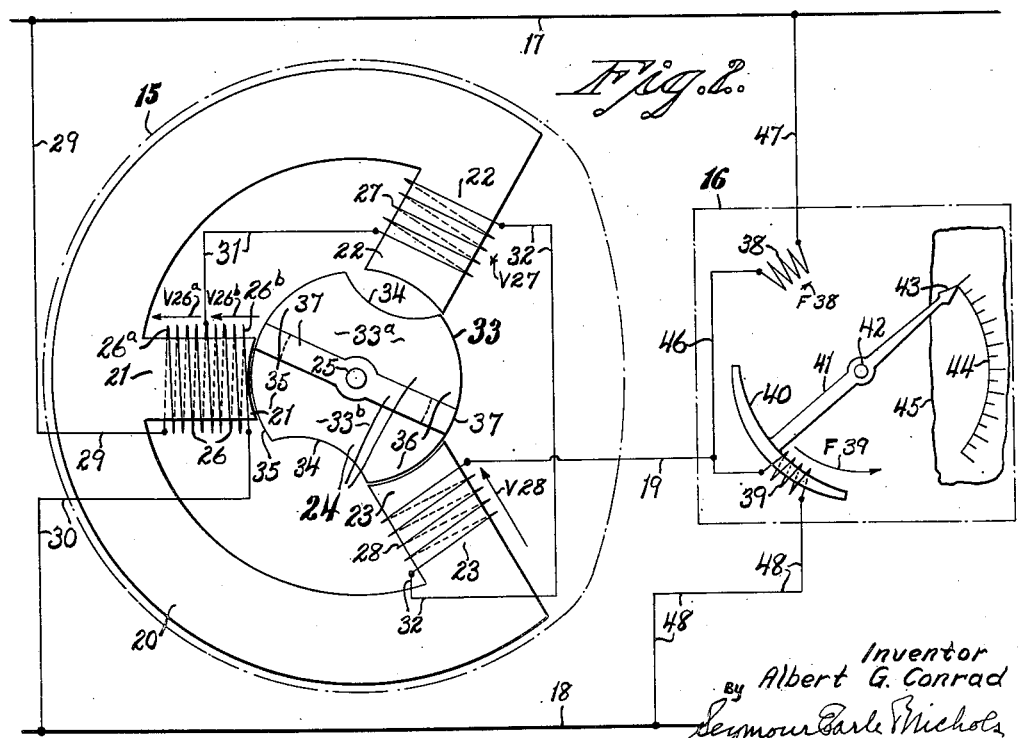
Inventor
By Albert G. Conrad
Seymour Earle Nichols
Attorneys July 3, 1945.   A. G. CONRAD   2,379,417
ELECTRICAL REMOTE-READING POSITION-INDICATING APPARATUS
Filed Feb. 1, 1944   3 Sheets-Sheet 2
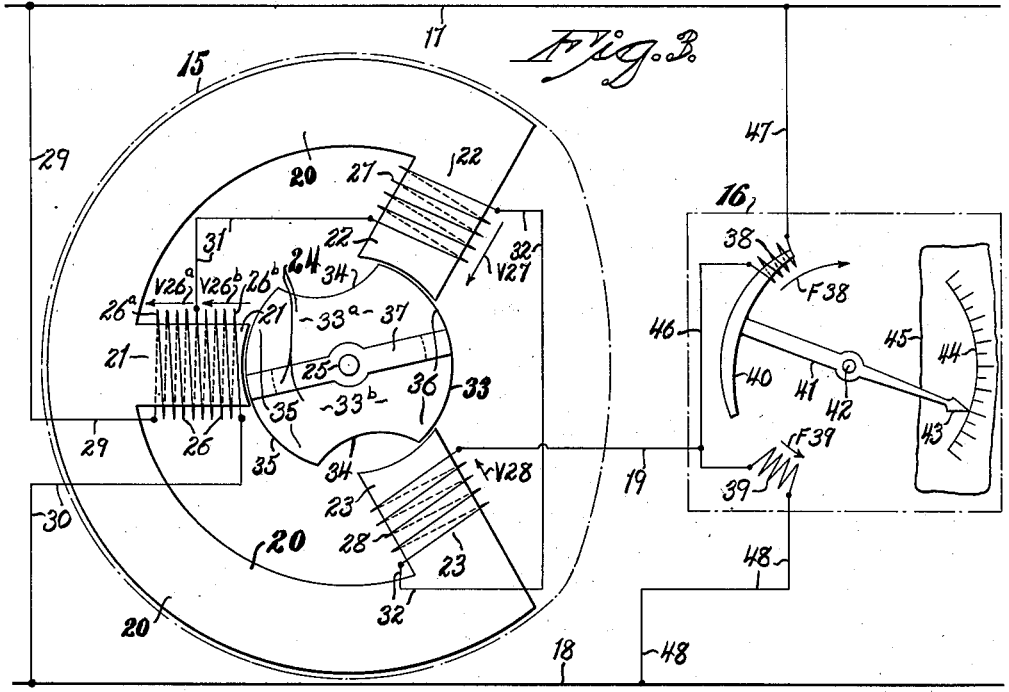
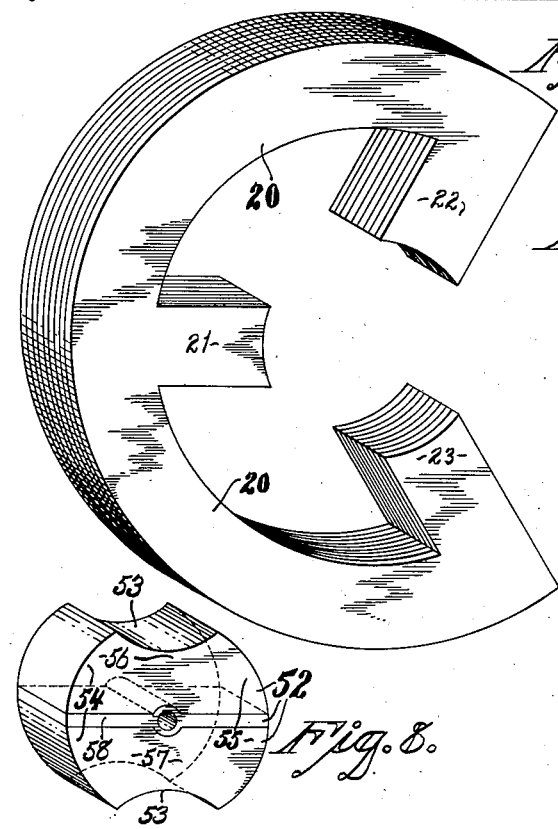
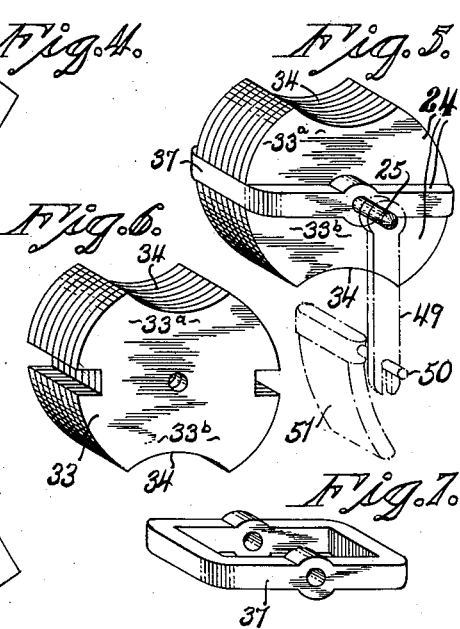
Inventor
By Albert G. Conrad
Seymour Earl Nichols
Attorneys

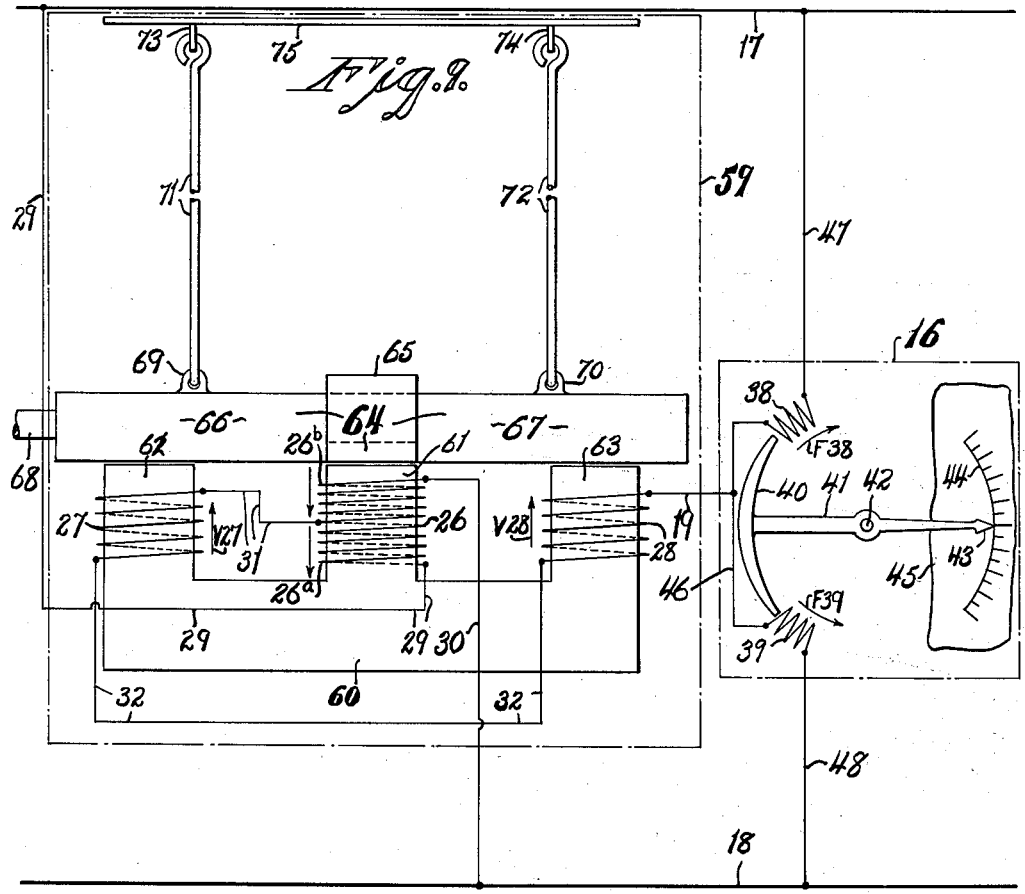
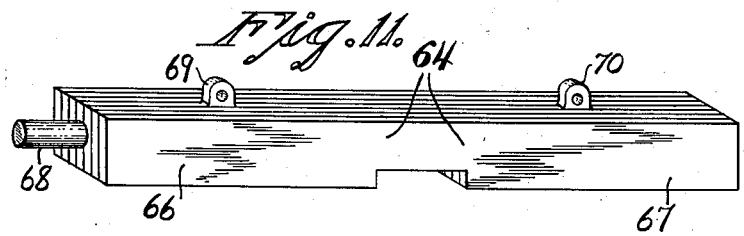
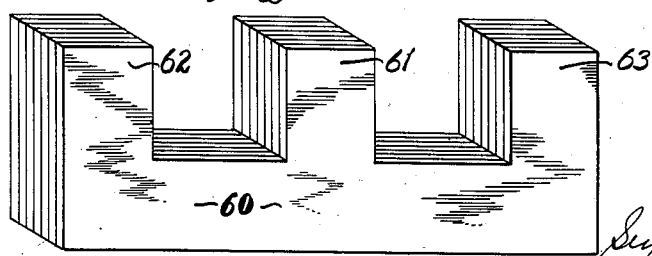
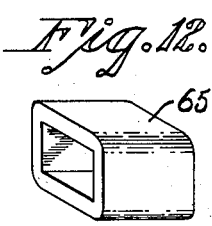

Patented July 3, 1945

2,379,417

UNITED STATES PATENT OFFICE 2,379,417

ELECTRICAL REMOTE-READING POSITION-INDICATING APPARATUS

Albert G. Conrad, Mount Carmel, Conn., assignor to Manning, Maxwell & Moore, Inc., Bridgeport, Conn., a corporation of New Jersey Application February 1, 1944, Serial No. 520,624

7 Claims. (Cl. 177—351)

The present invention relates to improvements in position-indicating apparatus and relates more particularly to improvements in electrical remote-reading position-indicating apparatus, i. e., electrical position-indicating apparatus of a type wherein a transmitting- or detecting-portion of the apparatus may be situated at one station or location and electrically connected to a receiving- or indicating-portion of the apparatus which is situated at a different station or location.

As will more fully appear from the following, the present invention is useful in responding to changes in fluid levels, temperatures, pressures and other variables existing at one station or location and indicating such measurements at a relatively-remote point or station. The degree of remoteness between the points or stations referred to may vary from a few inches to thousands of feet, if desired.

One of the objects of the present invention is to provide a superior remote-reading indicating-apparatus or -system which will effectively and reliably measure variable conditions existing at one station and indicate such measurements at a relatively-remote point without being substantially affected by wide ranges of temperature changes.

Another object of the present invention is to provide a superior indicating-apparatus or -system of minimum weight and complexity.

A further object of the present invention is to provide a superior apparatus or system of the character referred to and capable of electrically ascertaining, electrically transmitting and electrically indicating variables without requiring the use of sliding contacts or the like.

Still another object of the present invention is to provide a superior remote-reading indicating-apparatus operating electrically, and the accuracy of which is substantially independent of differences in the voltage-values applied to it.

A still further object of the present invention is to provide a superior detecting- or transmitting-device for electrically-operated remote-reading indicating-apparatus or -systems, and in which the torque required to maintain a given position of the detecting- or transmitting-device is substantially zero.

Another object of the present invention is to provide a superior detecting- or transmitting-device operating electrically and which will act, in conjunction with a suitable remotely-located receiver or indicator, in such manner that the calibration of the system is rendered substantially independent of widely-different voltages applied thereto and of changes in circumambient temperatures.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic view of one form of remote-reading position-indicating apparatus embodying the present invention and showing the armature of the detecting-transmitter device in its intermediate or neutral position;

Fig. 2 is a view corresponding to Fig. 1 save that the armature is turned to substantially the limit of its movement in a clockwise direction with a corresponding deflection of the pointer of the indicating-receiver device;

Fig. 3 is a view similar to Figs. 1 and 2 but showing the armature turned about midway toward the limit of its movement in a counterclockwise direction, thus causing a corresponding deflection of the pointer of the indicating-receiver device;

Fig. 4 is a perspective view of the field-frame, detached;

Fig. 5 is a similar view of the armature-unit or rotor;

Fig. 6 is a perspective view of the armature-core, detached;

Fig. 7 is a similar view of the short-circuiting band of the armature-unit, detached;

Fig. 8 is a perspective view of a modified form of armature-unit suitable for use in lieu of the armature-unit of the preceding figures;

Fig. 9 is a schematic view of a modified form of position-indicating apparatus embodying the present invention;

Fig. 10 is a perspective view of the field-frame of the structure of Fig. 9;

Fig. 11 is a similar view of the armature of the structure of Fig. 9; and

Fig. 12 is a perspective view of the short-circuiting band of the armature shown in Figs. 9 and 11.

The structure of Figs. 1 to 7 inclusive

The particular position-indicating apparatus illustrated in Figs. 1 to 7 inclusive comprises two main devices which may be respectively aptly termed a detecting-transmitter device generally designated by the reference character 15 and an indicating-receiver device generally designated by the reference character 16. The two said devices are electrically interconnected by complemental line-wires 17 and 18 and a third wire 19. The complemental line-wires 17 and 18 just referred to, may be connected to any suitable source of alternating or pulsating current.

The detecting-transmitter device 15 includes a field-frame 20 formed of magnetic material such as soft iron or silicon steel, and is preferably laminated to minimize eddy-currents, though the latter effect may be achieved by using sintered powdered metal. The said field-frame 20 will normally be stationary and therefore, may be viewed as a stator-frame and is formed with a central primary pole-salient 21 flanked in a circumferential direction on its respective opposite sides by one of two secondary pole-salients respectively designated by the reference characters 22 and 23. The pole-salients 21, 22 and 23 all extend radially inwardly toward a common center and are displaced with respect to each other in a circumferential direction at equal angles. The respective inner faces of the said pole-salients 21, 22 and 23 are cylindrically contoured about a common center to accommodate an armature-unit or rotor generally designated by the reference character 24 and having a shaft 25 which may be mounted for turning movement in any suitable bearings (not shown).

The primary pole-salient 21 of the field-frame 20 is encircled by a primary-coil 26, while the supplemental pole-salients 22 and 23 are respectively encircled by secondary-coils 27 and 28.

One of the end-terminals of the primary-coil 26 above referred to, is connected by a wire 29 to the line-wire 17, while the opposite end-terminal of the said primary-coil is connected by a wire 30 to the complemental line-wire 18. The middle of the primary-coil 26 has connected thereto one end of a wire 31 leading to one end-terminal of the secondary-coil 27 before referred to. The remaining end-terminal of the secondary-coil 27 is connected by means of a wire 32 to one end-terminal of the secondary-coil 28. The remaining end-terminal of the secondary-coil 28 is connected to the third wire 19 before referred to. The connection of the wire 31 to the middle or mid-tap of the primary-coil 26 may, for convenience of description, be said to divide the latter into two coil-sections respectively designated by the reference characters 26a and 26b.

The armature-unit or rotor 24 before referred to, includes an armature-core 33 which is formed of suitable magnetic material such, for instance, as soft iron or silicon steel and is preferably laminated or otherwise formed to minimize eddy-currents. The said armature-core is, generally speaking, of cylindrical form save where it is formed in each of its opposite sides with one of two arcuate-grooves 34—34 extending in parallelism with the shaft 25. The grooves 34—34 just referred to result in providing the armature-core 33 with two diametrically-opposite pole-salients respectively generally designated by the reference characters 35 and 36 having their peripheries conforming in curvature but slightly spaced from the cylindrically-contoured inner ends of the respective pole-salients 21, 22 and 23 of the field-frame 20.

Extending completely arount the armature-core 33 is a short-circuiting band 37 formed of copper or other high electro-conductive material and extending in a plane substantially parallel with the plane in which the shaft 25 extends so as to, in effect, divide the armature-core 33 into two substantially-independent flux-carrying sections 33a and 33b which are magnetically segregated from each other by the said band 37 or its equivalent.

The indicating-receiver or motion-indicating device 16 may be in the form of any suitable ratio-meter and, in the instance shown, includes two complemental coils 38 and 39 spaced from each other so as to each receive one of the respective opposite end-portions of an arcuate armature 40. The said armature is carried at the inner end of a lever 41 turning about a pivot 42. At its outer end, the lever 41 is formed with a pointer or indicator 43 adapted to sweep over suitably-spaced indicia 44 printed or otherwise applied to the surface of a dial-plate 45.

The coils 38 and 39 have their axes arranged on a radius substantially corresponding to the radius of the armature 40 and have their respective inner ends located immediately adjacent the respective outer ends of the said armature when the latter is in its intermediate position, as indicated in Fig. 1.

The respective inner terminals of the coils 38 and 39 of the motion-indicating device 16 are interconnected by a wire 46 to which latter the adjacent end of the third wire 19 before referred to is connected. The outer terminal of the coil 38 is connected to the line-wire 17 by a wire 47, while the outer terminal of the coil 39 is connected to the line-wire 18 by a wire 48.

The forces respectively developed by the said coils 38 and 39 at any given instant while variable relative to each other, are, however, always such as to oppose each other in their respective efforts to move the armature 40 in opposite directions.

It will be noted by reference to Figs. 1, 2 and 3 in particular, that the primary-coil 26 considered as a whole, has its respective opposite terminals connected respectively to the line-wires 17 and 18. It will be further noted that the secondary-coils 27 and 28 are in series with each other and connected between the mid-tap of the primary-coil 26 and the wire 46 which latter interconnects the coils 38 and 39 of the indicating-receiver 16.

The primary-coil 26 and the secondary-coils 27 and 28 are so arranged and interconnected that the voltages existing across the coil-sections 26a and 26b are in the same direction while the respective adjustable voltages existing across the said secondary-coils 27 and 28 are always in opposition to each other.

For purposes of making clear the functioning of the particular apparatus illustrated in Figs. 1 to 7 inclusive, the respective voltages under the different conditions illustrated, are indicated schematically, both as to magnitude and direction, by arrows in Figs. 1, 2 and 3. Thus the voltages across the coil-sections 26a and 26b are respectively schematically indicated by the arrows V26a and V26b. Likewise, the voltages across the secondary-coils 27 and 28 are respectively indicated by the arrows V27 and V28. The forces or torques developed by the coils 38 and 39 are respectively indicated by the arrows F38 and F39.

Now let it be assumed that the parts of the apparatus are in the positions in which they are indicated in Fig. 1 and that a desired voltage-difference exists between the line- or supply-wires 17 and 18. Let it further be assumed that the armature-unit 24 is mechanically connected by a lever 49 and pin 50 to a Bourdon tube 51 (Fig. 5) or other actuating-device, the position of which it is desired to indicate by the device 16.

Under these circumstances, the flux developed in the primary pole-salient 21 by the primary-coil 26 may, at a given instant, be considered as flowing radially inwardly from the inner end of the said primary pole-salient. Such flux will divide itself substantially equally and one-half will flow through the flux-carrying section 33a of the armature-core 33 and the other half will flow through the flux-carrying section 33b of the said armature-core.

The flux flowing through the flux-carrying section 33a of the armature-core 33 will then pass to the inner end of the secondary pole-salient 22 and thence outwardly through the said pole-salient and back to the outer end of the primary pole-salient 21 through the arcuate upper portion of the field-frame 20. The other half of the flux above referred to which passes through the flux-carrying section 33b of the armature-core 33 will, under these assumed conditions, pass into the inner end of the secondary pole-salient 23 and thence outwardly through the said pole-salient and back to the outer end of the primary pole-salient 21 through the interconnecting portion of the field-frame 20.

Under the conditions just above described, the voltages respectively existing across the secondary-coils 27 and 28 will be equal in magnitude though opposite in direction, with the result that the said secondary-coils will add no voltages to the voltages already existing across the coils 38 and 39 of the indicating-receiver device 16. Hence, the respective forces developed by the coils 38 and 39 will be equal in magnitude though, as before noted, opposite in direction. Thus, the armature 40 of the device 16 will be held in its mid-position as indicated in Fig. 1, so that the pointer 43 will stand midway of the series of indicia 44 on the dial-plate 45 to correctly indicate that the armature-unit 24 of the device 15 is in its mid-position.

Let it now be assumed that the armature-unit 24 has been shifted to the limit of its movement in a clockwise direction (Fig. 2) by the outer end of the Bourdon-tube 51, which latter has, in turn, changed its position due to a change of internal pressure.

Under the conditions just above referred to, the flux generated in the primary pole-salient 21 will flow almost entirely through the flux-carrying section 33b of the armature-core 33 and none but a small amount of leakage-flux will pass through the flux-carrying section 33a. This flow of flux will result from two factors, i. e., (a) the substantially full registry of the pole-salients 35 and 36 of the armature-core 33 respectively with the pole-salients 21 and 23 of the field-frame 20 and the non-registry of the pole-salient 36 with the secondary pole-salient 22, and (b) the "shielding-action," so to speak, of the short-circuiting band 37 or its equivalent in preventing or materially restricting the flow of flux through its interior.

The flux passing through the flux-carrying section 33b as just above described, will pass into the inner end of the pole-salient 23 of the field-frame, thence through the outer end of the said pole-salient and through the interconnecting portion of the field-frame 20 to the outer end of the primary pole-salient 21. The described flow of flux through the secondary pole-salient 23 will cause an increase in the voltage across the secondary-coil 28 in an amount substantially corresponding to the decrease in voltage which has now occurred across the secondary-coil 27 occasioned by the failure of any appreciable flux to flow therethrough.

The increase in voltage across the secondary-coil 28 will cause an increase in the force generated by the coil 39 of the indicating-receiver device 16, while the proportionate fall in the voltage across the secondary-coil 27 will cause a corresponding lowering in the force generated by the coil 38 of the device 16. Under these conditions, the armature 40 of the indicating-receiver device will be turned to the limit of its movement in one direction as indicated in Fig. 2, and thereby cause the pointer 43 to register with the uppermost of the indicia 44 on the dial-plate 45, thus accurately indicating that the armature-unit 24 has been turned to the limit of its movement in one direction.

Now let it be assumed that the armature-unit 24 has been turned, by a change in the position of the end of the Bourdon-tube 51, into the position in which the said armature-unit is indicated in Fig. 3. The position just referred to is that assumed by the armature-unit 24 when the same is turned about halfway between its intermediate position (Fig. 1) and the limit of its movement in a counterclockwise direction.

When the armature-unit 24 is moved into position shown in Fig. 3, the voltage across the secondary-coil 27 will be increased by substantially the same amount that the voltage across the other secondary-coil 28 has been decreased, as is schematically represented by the arrows V27 and V28 in Fig. 3. This change of relative voltages across the coils 27 and 28 will cause a substantially-corresponding rise in the force F38 generated by the coil 38 and a corresponding drop in the force F39 developed by the coil 39.

Here again, the result will be that the armature 40 of the indicating-receiver device 16 will be deflected to an amount proportionate to the amount of deflection imparted to the armature-unit 24 of the detecting-transmitter device 15.

*The structure of Fig. 8*

In Fig. 8 is shown a modified form of armature-unit generally designated by the reference character 52 and which is suitable for use in the detecting-transmitter device 15 of the preceding figures in lieu of the armature-unit 24.

The armature 52, like the armature 24 before referred to, is formed in its respective opposite sides with one of two arcuate grooves 53—53 resulting in providing the structure with two diametrically-opposite pole-saliehts respectively generally designated by the reference characters 54 and 55.

Instead of being of one unitary structure of magnetic material with a band extending therearound as in the case of the armature-unit 24, the armature-unit 52 comprises two physically-distinct flux-carrying sections 56 and 57 respectively separated from each other by a short-circuiting plate 58 formed of copper or other high electro-conductive material, and functioning to magnetically segregate the two flux-carrying sections 56 and 57 from each other.

The armature-unit 52 may have its flux-carrying sections 56 and 57 formed of sintered powdered iron or other magnetic material bonded to the respective opposite faces of the short-circuiting plate 58.

*The structure of Figs. 9 to 12 inclusive*

In the structure of the figures referred to, a modified form of detecting-transmitter device is employed, which device is generally designated by the reference character 59. The device 59 is shown as connected to an indicating-receiver device 16 which has been previously described.

The detecting-transmitter device 59 includes a field-frame 60 formed of magnetic material and having a central primary pole-salient 61 flanked on each of its respective opposite sides by one of two secondary pole-salients 62 and 63. As shown, the outer ends of all three of the pole-salients 61, 62 and 63 lie in a common plane closely adjacent the inner face of a bar-like armature 64.

The bar-like armature 64 above referred to is centrally encircled by a short-circuiting band 65 which serves to magnetically divide the said armature into two flux-carrying sections 66 and 67. The armature 64 may have a rod 68 (Fig. 9) connected to one end thereof for the purpose of shifting the said armature lengthwise of itself with respect to the field-frame 60.

For the purpose of suspending the armature 64 closely adjacent the outer faces of the pole-salients 61, 62 and 63, with capacity for rectilinear movement with respect thereto, the said armature is formed in the instance shown with two spaced-apart eyes 69 and 70 respectively receiving the lower ends of complemental suspension-links 71 and 72. The upper ends of the suspension-links 71 and 72 just referred to are respectively hooked into eyes 73 and 74 depending from a mounting-plate 75.

Encircling the primary pole-salient 61 is a primary-coil 26 comprising two coil-sections 26a and 26b as before described in connection with the structure of Figs. 1 to 7 inclusive. Similar to the structure previously described, the secondary pole-salients 62 and 63 are respectively encircled by secondary-coils 27 and 28. The various coils above referred to are interconnected in the same manner as has been described in connection with the structure of Figs. 1 to 7 inclusive and the wiring bears like reference characters.

When the armature 66 is shifted from its intermediate position in which it is shown in Fig. 9, it will have the same effect as has been described in connection with the armature-unit 24 when the same is shifted from its intermediate position.

*General considerations*

It will be noted that in all of the forms of the invention illustrated in the accompanying drawings, two complemental secondary-coils are electrically interconnected with each other and with a primary-coil and further, that the said coils are adjustably interconnected magnetically by a movable armature.

As a result of the construction and arrangement just above referred to, the apparatus is rendered extremely sensitive and accurate in that the changes of position of an armature of a given detecting-transmitter device will immediately and proportionately be indicated by its complemental indicating-receiver device.

The short-circuiting bands or their equivalent above described, serve to magnetically segregate two complemental flux-carrying sections of a given armature from each other so that leakage-flux is minimized and the device is rendered sensitive and accurate to relatively-slight relative movements of a given armature with respect to its field-frame.

Inasmuch as the indicating-receiver device responds to relative changes of voltages occurring in the two opposed secondary-coils of the complemental detecting-transmitter device, wide variations in the voltage of the power-supply will not affect the accuracy of the apparatus.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An electrical remote-reading position-indicating apparatus, including in combination: a detecting-transmitter device including a field-structure and a complemental armature-structure, one of which structures is movable with respect to the other; the said field-structure including a primary-coil, two secondary-coils constructed and arranged to be inductively energized by flux generated by the said primary-coil, and means electrically interconnecting the said primary-coil and the two said secondary-coils; the said armature-structure having short-circuiting means dividing the same into two magnetically-segregated flux-carrying sections, the said armature-structure being constructed and arranged to cause one of its said flux-carrying sections to progressively increase the flow of flux between the said primary-coil and one of the said secondary-coils and to coincidentally cause the other flux-carrying section to progressively diminish the flow of flux between the said primary-coil and the other of the said secondary-coils as relative movement takes place between the said field-structure and the said armature-structure; and an indicating-receiver device electrically interconnected with the said detecting-transmitter device and provided with an indicator constructed and arranged to respond to changes in the voltages respectively applied to the said secondary-coils as changes of position take place between the armature-structure and field-structure.

2. An electrical remote-reading position-indicating apparatus, including in combination: a detecting-transmitter device including a field-structure and a complemental armature-structure, one of which structures is movable with respect to the other; the said field-structure including a primary-coil comprising two interconnected coil-sections, two secondary-coils constructed and arranged to be inductively energized by flux generated by the said primary-coil, and means electrically interconnecting the two coil-sections of the said primary-coil and the two said secondary-coils in series; the said armature-structure having short-circuiting means dividing the same into two magnetically-segregated flux-carrying sections, the said armature-structure being constructed and arranged to cause one of its said flux-carrying sections to progressively increase the flow of flux between the said primary-coil and one of the said secondary-coils and to coincidentally cause the other flux-carrying section to progressively diminish the flow of flux between the said primary-coil and the other of the said secondary-coils as relative movement takes place between the said field-structure and the said armature-structure; and an indicating-receiver device electrically interconnected with the said detecting-transmitter device and provided with an indicator constructed and arranged to respond to changes in the voltages respectively applied to the said secondary-coils as changes of position take place between the armature-structure and field-structure.

3. An electrical remote-reading position-indicating apparatus, including in combination: a detecting-transmitter device including a field-structure and a complemental armature-structure, one of which structures is movable with respect to the other; the said field-structure including a field-frame having a primary pole-salient and two secondary pole-salients, a primary-coil mounted on the primary pole-salient of the said field-frame, two secondary-coils respectively mounted on the secondary pole-salients of the said field-frame, and means electrically interconnecting the said primary-coil and the two said secondary-coils; the said armature-structure having short-circuiting means dividing the same into two magnetically-segregated flux-carrying sections, the said armature-structure being constructed and arranged to cause one of its said flux-carrying sections to progressively increase the flow of flux between the said primary pole-salient and one of the said secondary pole-salients and to coincidentally cause the other flux-carrying section to progressively diminish the flow of flux between the said primary pole-salient and the other of the said secondary pole-salients as relative movement takes place between the said field-structure and the said armature-structure; and an indicating-receiver device electrically interconnected with the said detecting-transmitter device and provided with an indicator constructed and arranged to respond to changes in flux passing through the said secondary pole-salients as changes in position take place between the armature-structure and the said field-structure.

4. An electrical remote-reading position-indicating apparatus, including in combination: a detecting-transmitter device including a field-structure and a complemental armature-structure, one of which structures is movable with respect to the other; the said field-structure including a field-frame having a primary pole-salient and two secondary pole-salients, a primary-coil comprising two electrically-interconnected coil-sections mounted on the primary pole-salient of the said field-frame, two secondary-coils respectively mounted on the secondary pole-salients of the said field-frame, and means electrically interconnecting the two coil-sections of the said primary-coil and the two said secondary-coils in series; the said armature-structure having short-circuiting means dividing the same into two magnetically-segregated flux-carrying sections, the said armature-structure being constructed and arranged to cause one of its said flux-carrying sections to progressively increase the flow of flux between the said primary pole-salient and one of the said secondary pole-salients and to coincidentally cause the other flux-carrying section to progressively diminish the flow of flux between the said primary pole-salient and the other of the said secondary pole-salients as relative movement takes place between the said field-structure and the said armature-structure; and an indicating-receiver device electrically interconnected with the said detecting-transmitter device and provided with an indicator constructed and arranged to respond to changes in flux passing through the said secondary pole-salients as changes in position take place between the armature-structure and the said field-structure.

5. A detecting-transmitter device for use in electrical remote-reading position-indicating apparatus, including in combination: a field-structure and a complemental armature-structure, one of the said structures being movable with respect to the other; the said field-structure including a primary-coil, two secondary-coils constructed and arranged to be inductively energized by flux generated by the said primary-coil and means electrically interconnecting the said primary-coil and the two said secondary-coils; the said armature-structure having short-circuiting means dividing the same into two magnetically-segregated flux-carrying sections, the said armature-structure being constructed and arranged to cause one of its said flux-carrying sections to progressively increase the flow of flux between the said primary-coil and one of the said secondary-coils and to coincidentally cause the other flux-carrying section to progressively diminish the flow of flux between the said primary-coil and the other of the said secondary-coils as relative movement takes place between the said field-structure and the said armature-structure.

6. A detecting-transmitter device for use in electrical remote-reading position-indicating apparatus, including in combination: a field-structure and a complemental armature-structure, one of the said structures being movable with respect to the other; the said field-structure including a primary-coil comprising two interconnected coil-sections, two secondary-coils constructed and arranged to be inductively energized by flux generated by the said primary-coil, and means electrically interconnecting the two coil-sections of the said primary-coil and the two said secondary-coils in series; the said armature-structure having short-circuiting means dividing the same into two magnetically-segregated flux-carrying sections, the said armature-structure being constructed and arranged to cause one of its said flux-carrying sections to progressively increase the flow of flux between the said primary-coil and one of the said secondary-coils and to coincidentally cause the other flux-carrying section to progressively diminish the flow of flux between the said primary-coil and the other of the said secondary-coils as relative movement takes place between the said field-structure and the said armature-structure.

7. A detecting-transmitter device for use in electrical remote-reading position-indicating apparatus, including in combination: a field-structure and a complemental armature-structure, one of the said structures being movable with respect to the other; the said field-structure including a field-frame having a primary pole-salient and two secondary pole-salients, a primary-coil mounted on the primary pole-salient of the said field-frame, two secondary-coils respectively mounted on the secondary pole-salients of the said field-frame, and means electrically interconnecting the said primary-coil and the two said secondary-coils; the said armature-structure having short-circuiting means dividing the same into two magnetically-segregated flux-carrying sections, the said armature-structure being constructed and arranged to cause one of its said flux-carrying sections to progressively increase the flow of flux between the said primary pole-salient and one of the said secondary pole-salients and to coincidentally cause the other flux-carrying section to progressively diminish the flow of flux between the said primary pole-salient and the other of the said secondary pole-salients as relative movement takes place between the said field-structure and the said armature-structure.

ALBERT G. CONRAD.